(12) United States Patent
Walsh et al.

(10) Patent No.: US 9,643,381 B2
(45) Date of Patent: May 9, 2017

(54) COMPOSITE BINDING MATERIALS

(71) Applicant: LumaDyne, LLC, Alvin, TX (US)

(72) Inventors: Sean R. Walsh, Houston, TX (US); Christopher L. Harris, Alvin, TX (US)

(73) Assignee: VINDICOAT, LLC, Alvin, TX (US)

( * ) Notice: Subject to any disclaimer, the term of this patent is extended or adjusted under 35 U.S.C. 154(b) by 300 days.

(21) Appl. No.: 14/281,509

(22) Filed: May 19, 2014

(65) Prior Publication Data

US 2015/0328863 A1    Nov. 19, 2015

(51) Int. Cl.
*B32B 5/00* (2006.01)
*B32B 7/00* (2006.01)
(Continued)

(52) U.S. Cl.
CPC .................. *B32B 5/02* (2013.01); *B32B 5/00* (2013.01); *B32B 5/022* (2013.01); *B32B 5/24* (2013.01); *B32B 7/00* (2013.01); *B32B 7/12* (2013.01); *B32B 9/00* (2013.01); *B32B 15/00* (2013.01); *B32B 15/04* (2013.01); *B32B 15/08* (2013.01); *B32B 27/06* (2013.01); *B32B 27/28* (2013.01); *B32B 37/12* (2013.01); *B32B 38/0008* (2013.01); *B32B 38/162* (2013.01); *B32B 2037/1253* (2013.01); *B32B 2037/243* (2013.01); *B32B 2250/00* (2013.01); *B32B 2260/021* (2013.01); *B32B 2262/00* (2013.01); *B32B 2262/0261* (2013.01); *B32B 2262/10* (2013.01); *B32B 2262/101* (2013.01); *B32B 2262/106* (2013.01); *B32B 2307/558* (2013.01); *B32B 2307/732* (2013.01); *B32B 2309/02* (2013.01); *B32B 2309/04* (2013.01); *B32B 2310/0454* (2013.01); *B32B 2310/0806* (2013.01); *B32B 2311/00* (2013.01); *B32B 2439/00* (2013.01); *Y10T 428/31663* (2015.04)

(58) Field of Classification Search
CPC .. B32B 5/00; B32B 5/02; B32B 5/022; B32B 5/20; B32B 5/24; B32B 7/00; B32B 7/10; B32B 7/12; B32B 9/00; B32B 15/00; B32B 15/04; B32B 15/08; B32B 27/00; B32B 27/06; B32B 27/20; B32B 27/28; B32B 37/00; B32B 37/10; B32B 37/12
See application file for complete search history.

(56) References Cited

U.S. PATENT DOCUMENTS 4,085,012 A    4/1978   Marceau
5,089,063 A    2/1992   Harrah
(Continued)

OTHER PUBLICATIONS

International Preliminary Report on Patentability for PCT/US2015/031534 dated Dec. 1, 2016 (10 pages).
PCT Publication and Search Report for PCT/US2015/031534 dated Nov. 26, 2015 (35 Pages).

*Primary Examiner* — Michael N Orlando
*Assistant Examiner* — Matthew Hoover
(74) *Attorney, Agent, or Firm* — Conley Rose, P.C.

(57) ABSTRACT

A metal composite including an oxidized base metal and a fibrous composite material coupled by a self-assembled monolayer and adhesive is described. Additionally, a method of constructing a metal composite is described, wherein the method includes oxidizing a metal, depositing a self-assembled monolayer, and adhering a fibrous composite to the monolayer.

15 Claims, 14 Drawing Sheets

(51) Int. Cl.
*B32B 9/00* (2006.01)
*B32B 15/00* (2006.01)
*B32B 27/00* (2006.01)
*B32B 37/00* (2006.01)
*B32B 5/02* (2006.01)
*B32B 5/24* (2006.01)
*B32B 7/12* (2006.01)
*B32B 15/04* (2006.01)
*B32B 37/12* (2006.01)
*B32B 15/08* (2006.01)
*B32B 27/06* (2006.01)
*B32B 27/28* (2006.01)
*B32B 37/24* (2006.01)
*B32B 38/00* (2006.01)
*B32B 38/16* (2006.01)

(56) References Cited

U.S. PATENT DOCUMENTS

| | | | |
|---|---|---|---|
| 5,958,578 A * | 9/1999 | Blohowiak | B05D 3/102 |
| | | | 428/336 |
| 6,506,314 B1 | 1/2003 | Whitney | |
| 2005/0106403 A1* | 5/2005 | Yui | B32B 15/04 |
| | | | 428/469 |
| 2012/0052304 A1 | 3/2012 | Bhaaita | |
| 2013/0022756 A1 | 1/2013 | Augustine | |
| 2014/0178646 A1* | 6/2014 | Wolk | B32B 3/263 |
| | | | 428/161 |

* cited by examiner

| SAMPLE | LOAD CELL VOLTAGE | FORCE (lbf) | FORCE (N) | % INCREASE vs.UNTREATED | STRENGTH (MPa) |
|---|---|---|---|---|---|
| SRW-1-90a.1 4-40 untreated | 0.0111 V | 37 | 165 | -- | 1.72 |
| SRW-1-90a.2 2-56 untreated | 0.0045 V | 15 | 67 | -- | 1.10 |
| SRW-1-90b.1 4-40, treated | 0.0151 V | 50.3 | 224 | 36% | 2.33 |
| SRW-1-90b.2 2-56 treated | 0.0187 V | 62.3 | 277 | 315% | 4.54 |

COMPOSITE BINDING MATERIALS

CROSS-REFERENCE TO RELATED APPLICATIONS

None.

STATEMENT REGARDING FEDERALLY SPONSORED RESEARCH OR DEVELOPMENT

Not applicable.

BACKGROUND

This disclosure relates generally to the field of composite materials and more specifically, to a method of binding layered materials.

High-pressure and high-impact applications typically rely on metals and alloys thereof for strength. However, the standard materials, including steel, aluminum, titanium, and their alloys, have relatively high densities. As the application increases in size or required physical resistance to a force, the amount of these materials required results in the mass of the device becoming too high for efficient use. Fiber reinforced composites, including carbon fiber, have been used resist physical forces in extreme applications while minimizing mass. However, the fiber composite structures tend to be brittle and may be susceptible to separation or delamination.

SUMMARY

The present disclosure relates to bonding a metal to a fiber composite. In one application, the present disclosure includes metal composite comprising a base metal, having an oxidized surface layer, a self-assembled monolayer on the oxidized surface layer, an adhesive disposed on and coupled to the monolayer; and a second material disposed on and coupled to the adhesive. In some configurations, the monolayer comprises a silane and is configured to covalently bond to the oxidized surface layer. An adhesive is chosen to covalently bond the monolayer and the second layer. Further, second material comprises at least one fibrous composite. The fibrous composite is a fiber-reinforced composite chosen from the group consisting of fiberglass, carbon fiber, and aramid fiber composites.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 7 illustrates a table showing the sample construction and load increase of composites constructed according to an embodiment of the present disclosure;

DETAILED DESCRIPTION

Overview:

Metallic devices and containers may be further reinforced with fiber-reinforced or fibrous composite materials adhered to at least one surface. However, the aforementioned delamination failure mechanism may be related to the physical properties between the metal and the resin of the fiber-reinforced composite. More specifically, at a molecular level, the metal and resin of the fibrous composite are very different, leading to weak interactions at their interface, such as Van der Waals forces and other non-covalent bonds. The weak interactions are strained or sheared with exposure to high-pressures, temperature changes or differentials, impacts, bending or flexing, and other physical stresses without limitation.

Generally, the present disclosure is drawn to a method of altering the physical properties of the interface to promote stronger interactions between a metal and a fibrous composite, including covalent bonding. Devices and structures manufactured according to this method demonstrate increased delamination resistance at the metal and composite interface. More specifically, this method comprises functionalization of the supporting metal by the deposition of a self-assembled monolayer (SAM) thereon. The SAM comprises a bi-functional inorganic composition that covalently bonds to the metal at a first end and the composite at a second end. To facilitate the deposition and bonding of the SAM, the metal may be oxidized on the surface. Additionally, the fiber-reinforced composite may be treated with or include an epoxy component to bond to the SAM.

Method:

The method includes at least partially oxidizing a surface of the metal prior to deposition of the SAM. The metal is cleaned or stripped of any contaminants, oxidized, the SAM is deposited, and the SAM is contacted with the resin. While the SAM is generally an inorganic molecule or compound, it may configured to have different end groups such that it may interact with multiple resins, epoxies, hardeners, or other polymeric materials without limitation. The SAM may be formed from linear or branched molecules in order to facilitate covalent bonding to the metal and the fiber-reinforced composite.

Figure 1:
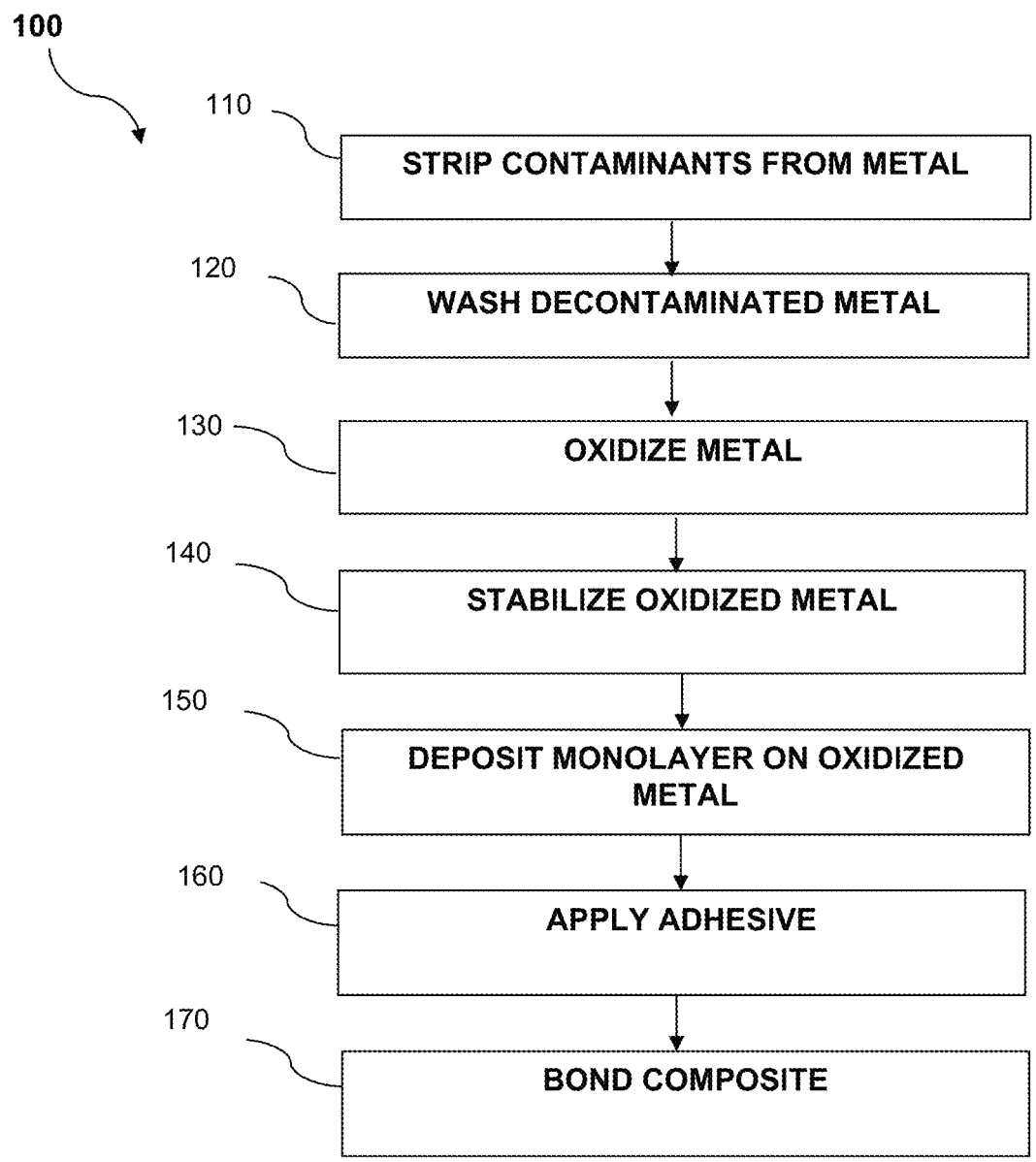
FIG. 1 illustrates a schematic of the method for binding composite materials.

Referring now to FIG. 1, there is illustrated a schematic of composite binding method 100. The composite binding method 100 comprises stripping contaminants from the metal 110, washing the decontaminated metal 120, oxidizing the metal 130, stabilizing the metal 140, depositing the self-assembled monolayer 150, applying an adhesive 160, and bonding the composite 170.

Still referring to FIG. 1, stripping contaminants from the metal 110 comprises treating the metal with a solvent. The metal may comprise any metal or allow without limitation. The solvent comprises any inorganic or organic solvent, including but not limited to acetone, isopropyl alcohol, limonene and other terpenes, hexanes, chloroform, dichloromethane, N-methylpyrrolidone, dimethyl sulfoxide, dimethylformamide, and others known to a skilled artisan. In some configurations of the present method, the solvent comprises an organic solvent, and in certain configurations the solvent comprises dichloromethane. Additionally, stripping contaminants from the metal 110 may further comprise sonicating or ultra-sonicating the metal in contact with the solvent. Mechanical agitation of the solvent and metal further loosens or removes contaminants from the surface of the metal. The metal hardness and ductility may influence the duration of sonication, but generally the metal is sonicated in the solvent for at least about 5 minutes to maximize contaminant release.

The decontaminated metal undergoes washing 120, in order to remove any solvent or contaminants that may still be on the surface. Washing the decontaminated metal 120 comprises treating the metal with a surfactant. The surfactant may be any inorganic or organic surfactant, or water. In certain instances, deionized or ultra-pure water may be used as the surfactant. Additionally, washing the decontaminated metal 110 may further comprise sonicating or ultra-sonicating the metal in contact with the surfactant. Mechanical agitation of the surfactant and metal further loosens or removes contaminants and solvents from the surface of the metal. As discussed hereinabove, the metal hardness and ductility may influence the duration of sonication, but generally the metal is sonicated in the surfactant for at least about 5 minutes, and in certain instance, at least about 20 minutes.

Oxidizing the metal 130 comprises treating the metal with acid. Exemplary acids include organic acids such as but not limited to citric acid or acetic acid, or inorganic acids such as, but not limited to sulfuric acid, nitric acid, or phosphoric acid. In instances, the acid comprises an inorganic acid and more specifically, nitric acid. Further, the acid may have a high concentration, for example at least about 20% by volume (v/v) or alternatively, at least about 40% (v/v). Additionally, oxidizing the metal 130 comprises heating the metal and the acid, for example to at least about 80° C. Oxidizing the metal with acid comprises treating the metal with acid for at least about 30 minutes; in some applications, treating the metal with acid for at least about 45 minutes; and in certain processes, treating the metal with acid for at least about 60 minutes. Without limitation by theory, use of acid solutions in the present step build an oxide passivation layer on the metal. Without limitation by any particular theory, the oxidizing the metal is not directed to substantially increasing the thickness of the oxide layer, because if the thickness of the oxide layer becomes too large it can detach from the underlying metal. Oxidizing the metal 130 forms surface hydroxyl groups that may preferentially react with the self-assembled monolayer.

Stabilizing the metal 140 comprises further washing and drying the oxidized metal. During the washing step of stabilizing the oxidized metal 140 the metal is washed or rinsed with a surfactant. The surfactant may be any inorganic or organic surfactant, or water. In certain instances, deionized or ultra-pure water may be used as the surfactant. Additionally, washing the oxidized metal may further comprise sonicating or ultra-sonicating the metal in contact with the surfactant. Mechanical agitation of the surfactant and metal further loosens or removes remaining acid contaminants and mechanically separates any loosened oxide layers from the surface of the metal. As discussed hereinabove, the oxidized metal hardness and ductility may influence the duration of sonication, but generally the oxidized metal is sonicated in the surfactant for at least about 5 minutes, and in certain instance, at least about 20 minutes. Without limitation by any particular theory, surfactant or water molecules may become associated or weakly bonded with oxidized metal particles or layers. Thus, the stabilizing the oxidized metal 140 comprises drying the oxidized metal. Generally, drying the oxidized metal comprises heating the metal, for example in an oven, to above the boiling point of the surfactant. The oxidized metal hardness and ductility may influence the duration of heating, but generally the oxidized metal is heated for at least about 5 minutes, and in certain instance, at least about 20 minutes. Alternatively, the oxidized metal may be heated for at least about 60 minutes. Further, the oxidized surfaces of the metal are hygroscopic, attracting and bonding with water molecules in the air. Thus, after drying the oxidized metal stabilizing the oxidized metal 130 comprises placing the oxidized metal in a substantially moisture free environment. Exemplary substantially moisture free environments include any container with a low relative humidity (RH), and exclude water or water vapor from entering, such as but not limited to a dry box or a vacuum box.

Depositing the self-assembled monolayer 150 comprises coating a monolayer precursor on the oxidized metal and maintaining conditions such that the precursor self-assembles into a monolayer. Generally, the oxidized metal is submerged in, sprayed with, or otherwise treated such that at least one surface is coated with the precursor. In instances, depositing the self-assembled monolayer 150 comprises submerging the oxidized metal in a solvent solution having a monolayer precursor dispersed therein. The oxidized metal is submerged for a sufficient period for the precursor to bond to the surface of the metal. For example, the oxidized metal is submerged for at least about 20 minutes; in some applications, the oxidized metal is submerged for at least about 30 minutes; and in exemplary processes, the oxidized metal is submerged in a solvent solution including a monolayer precursor for at least about 60 minutes.

Suitable solvents for submerging the oxidized metal into generally include any anhydrous inorganic solvent. Exemplary anhydrous solvents include anhydrous hexanes and anhydrous methanol, without limitation. In instances, the anhydrous inorganic solvent comprises a concentration of at least about 50% (v/v) of the solvent solution; alternatively, at least about 70% (v/v); and in certain instances, the anhydrous inorganic solvent comprises a concentration between about 80% (v/v) and about 90% (v/v) of the solvent solution. Additionally, the solvent solution may comprise an anhydrous tetrahalide. Nonlimiting exemplary tetrahalides may include carbon tetrachloride and silicon tetrachloride. The anhydrous tetrahalide comprises a concentration of between about 10% (v/v) and 20% (v/v) of the solvent solution.

As described hereinabove, the monolayer precursor solution is dispersed in the solvent solution. The monolayer precursor comprises a concentration of at least about 0.01 M (Molar), and in certain instances, the monolayer precursor comprises a concentration of at least about 0.05 M, in the solvent solution.

Generally, the monolayer precursor suspension and resulting SAM comprises any composition that reacts with a predetermined adhesive. The adhesives are described further hereinbelow. In a non-limiting, theoretical example, an adhesive or epoxy, comprises thermosetting polymers is used, thus the endgroups of the SAM are configured to interact with and have the same functionality as the endgroups in the adhesive used. In the present example, that would relate to an amine end group for interacting with epoxy and cyanoacrylate, and an isocyanate endgroup for interacting with polyurethane.

The monolayer precursor solution comprises organosilicon composition, also referred to as a silane. In instances, the silane comprises a modified tetramethoxy-silane having a methoxy-group substitution for an amino-group, and wherein amino-group comprises any number of carbon atoms. In non-limiting exemplary processes, the amino-group comprises an aminopropyl group and more specifically, the monolayer-precursor solution comprises (3-aminopropyl)trimethoxysilane.

Depositing the self-assembled monolayer 150 further comprises maintaining conditions such that the precursor self-assembles into a monolayer. As described previously, the conditions are substantially moisture or water free. Thus, in some instances, depositing the SAM further comprises drying the precursor coated oxidized metal. Drying the precursor coated oxidized metal comprises placing the coated oxidized metal in a dry box, an oven, or another water and water vapor free environment for a drying period. Without limitation, the drying period comprises at least about 30 minutes; in instances the drying period is at least about 2 hours, and in certain instances, the drying period is at least about 3 hours. Without limitation by any particular theory, drying the coated oxidized metal permits the monolayer precursor to nucleate on the oxidized metal. Nucleating initiates the formation of the monolayer (SAM) and the covalent bonding of the monolayer to the oxidized metal surface.

Applying an adhesive 160 comprises coating the self-assembled monolayer (SAM) with any suitable adhesive. Applying an adhesive 160 comprises brushing, rolling, or spraying the adhesive onto the SAM disposed on the surface of the oxidized metal. Exemplary adhesives include glues, resins, epoxies, and the like that form a covalent bond with the SAM, without limitation. Additionally, the adhesive may comprise a hardener or a modifier. Further, applying an adhesive 160 may comprise heating or partially curing the adhesive.

In certain instances, applying an adhesive 160 comprises coating an alternate or second material in adhesive, wherein the second material is chosen to be bonded to the oxidized metal. Second materials may comprise fibrous composites or fiber-reinforced composites. Without limitation, as used herein fibrous composites include polymeric matrices supported and reinforced by fibers. Exemplary fibrous composites comprise fiberglass, carbon, aramid (e.g. KEVLAR®), or similar composite materials. In instances, the alternative materials comprise fibrous or woven composite sheets. In further applications, the alternate material comprises the SAM deposited on a second portion of oxidized metal. Alternatively, the second portion of oxidized metal comprises a second or different metal.

Bonding the composite 170 comprises coupling the adhesive coated metal to the second material and curing the adhesive. As described herein, the adhesive coats the SAM, which is covalently bonded to the metal and thus, the adhesive forms a covalent bond with itself, between the oxidized metal and an alternate material. Curing the adhesive comprises air curing, oven curing, radiation curing, or combinations thereof. In instances, curing comprises holding the coupled metal and alternate material portions in place for at least about 2 hours; alternatively, for at least about 6 hours; and in certain applications, for at least about 18 hours. Additionally in instances, curing comprises heating the coupled portions to a temperature of at least about 40° C.; alternatively, a temperature of at least about 50° C.; and in certain applications, curing comprises heating the coupled portions to a temperature of at least about 60° C. Radiation curing comprises exposing the coupled portions to ultra-violet (UV) or infra-red (IR) spectrum light, in certain applications. Without limitation by any particular theory, oven or radiation curing may be conducted for a portion of the total time necessary to cure the adhesive. In further instances, bonding the composite 170 comprises applying a pressure or a vacuum to the coupled portions in order to facilitate adhesion, for example by removing air or gas bubbles in the adhesive. In still additional instances, bonding the composite 170 comprises mechanically removing excess adhesive. In a non-limiting example, excess adhesive may be scraped, filed, vacuumed, or otherwise removed from the edges of the coupled portions to prevent contamination or damage to the end product.

Figure 2:
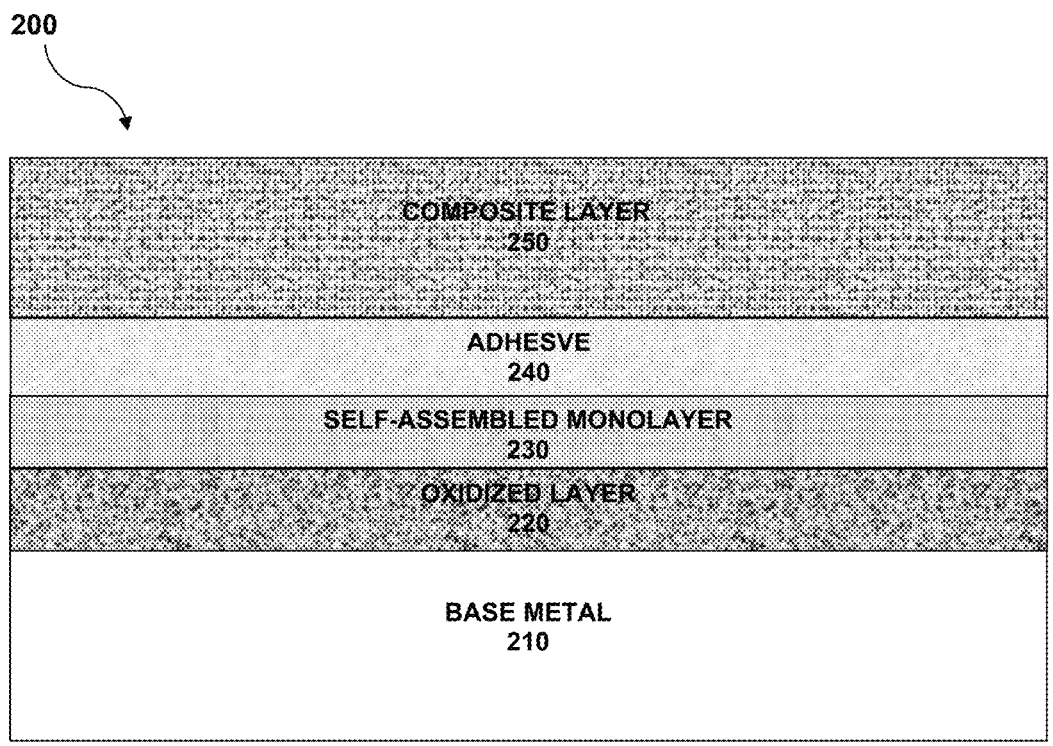
FIG. 2 illustrates a schematic of a layered composite material according to an embodiment of the present disclosure.

Referring now to FIG. 2, there is illustrated a schematic of a fiber-reinforced composite 200 constructed by the method described herein above. The schematic of the fiber reinforced composite 200 is not drawn to any particular scale and thus, merely illustrates the structure according to the present disclosure. Generally, the fiber reinforced composite comprises a base metal 210 having an oxidized layer 220. A self-assembled monolayer (SAM) 230 is covalently bound to the oxidized layer 220. Additionally, the self-assembled monolayer 230 is adjacent to and covalently bound to the adhesive layer 240, that likewise coupled to the overlying composite layer 250.

As described herein above, the base metal 210 comprises any metal or alloy, without limitation. The oxidized layer 220, comprises a layer of the base metal that has been oxidized, for example acid oxidized, and thus exists as a metal-oxide layer. The SAM 230 comprises an inorganic monolayer, and in instances, the monolayer is bifunctional. In further instances, the monolayer comprises a silane, such as but not limited to (3-aminopropyl)trimethoxysilane. The composite layer 250 comprises a fibrous composite material, such as but not limited to fiberglass, carbon-fiber, or aramid-fiber (e.g. KEVLAR®). The adhesive layer 240 comprises any adhesive that covalently binds with the SAM 230 and the composite layer 250.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented. To further illustrate various exemplary embodiments of the present invention, the following examples are provided.

EXAMPLES

Exemplary Process for Preparing a Layered Composite:

1.) Sonicate pieces for 5 minutes in dichloromethane ($CH_2Cl_2$)
2.) Sonicate pieces for 20 minutes in Ultrapure HPLC-grade $H_2O$
3.) Heat pieces in a 40% $HNO_3$ solution at ~80° C. for 1 hour
4.) Rinse pieces with HPLC-grade $H_2O$
5.) Sonicate pieces for 20 minutes in HPLC-grade $H_2O$
6.) Dry pieces in an oven
7.) Allow pieces to cool & place into a drybox
8.) In drybox, place pieces in a solution* of 80-90% (v/v) anhydrous hexanes, 10-20% (v/v) anhydrous $CCl_4$ that has (3-aminopropyl)trimethoxysilane (APTMS) in concentration of >0.05 M and let sit for one hour. Anhydrous methanol (MeOH) is also an acceptable solvent.
9.) Remove pieces from solution and let dry.
10.) Apply epoxy to pieces. The epoxy used in the following experiments was PRO-SET LAM-125 resin, mixed in a 3:1 volume ratio with PRO-SET LAM-226 medium cure speed hardener.

Figure 3:
FIG. 3 illustrates a photographic comparison of aluminum strips modified according to an embodiment of the present disclosure.

Metal to Metal Qualitative Shear Strength Testing:

Strips of aluminum sheet metal were cut in dimensions 1"×6" then bent across the short axis ~1" from the end, to an angle of ~30°. The pieces were treated with the standard steps in the experimental, #1-6 on 2013 May 28, 190 7-10 on 2013 May 29. Functionalization was performed in a crystallization dish with inner diameter 190.5 mm, height 95.25 mm, total internal volume ~2.7 L. The solution was 180 mL hexanes, 20 mL CCL4 and 2 mL APTMS (0.057 M). After the epoxy was applied to one piece, the other was pressed to it so that the bent sections faced outward from each other, allowing them to be used as handholds to pull the pieces apart. On May 30, 2013 it was discovered that the resin on the unmodified pieces had not cured completely, so they were placed in the oven at 50° C. for 3 hours. Both sets of pieces were pulled apart within 15 minutes; the treated pieces required noticeably more force. FIG. 3 demonstrates a side-by-side comparison.

Referring to FIG. 3, based on these pictures, several differences can be seen. The unmodified pieces have delaminated by separation from one side or the other in large clumps. These areas of delamination are clearly delineated with sharp edges. Additionally, the rear halves of the pieces have total delamination from one side. The modified pieces, in contrast, have a more even distribution of epoxy between pieces and the sizes of patches are smaller with more jagged edges. Notably, there are several spots on the pieces where delamination did not occur—there is epoxy on both pieces at the break spot. This means that the epoxy is the weak point, not the epoxy-surface interface.

Figure 4:
FIG. 4 illustrates a photographic comparison of air cured, coated aluminum strips according to an embodiment of the present disclosure.
Figure 5:
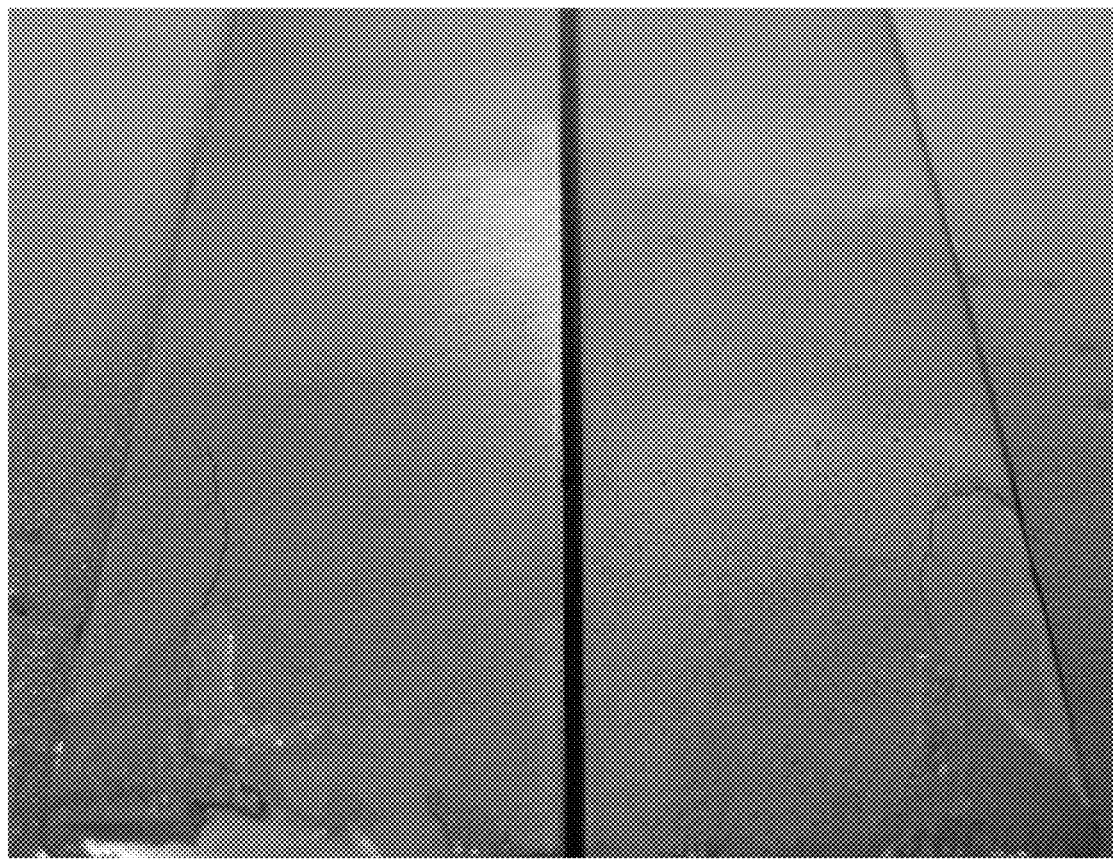
FIG. 5 illustrates a photographic comparison of coated aluminum strips after oven curing the resin (on the right strip) according to an embodiment of the present disclosure.

A second set of Al strips were made, this time to determine how curing the epoxy would affect the delamination. Steps #1-6 were performed on Jul. 23, 2013, #7-9 on Jul. 24, 2013, and step #10 on Jul. 25, 2013. The solution for functionalization was 200 mL MeOH with 2 mL APTMS (0.057 M); 6 mL epoxy and 2 mL hardener were used to make the resin. The uncured pieces were pulled apart 18 hours after application of the resin; oven curing (step #10) was done at 50° C. for 5 hours after the 18 hour air cure. FIGS. 4 and 5 show the air cured and oven cured pieces respectively FIGS. 4 and 5 show striking differences compared to the unmodified pieces. In the pieces cured for 18 hours at room temperature, there is no delamination at all. Both pieces had even coatings of the epoxy, and the stress and fracture lines can be seen as curves roughly perpendicular to the long axis. The oven cured pieces had almost total delamination from one side. However, there are discolorations on the Al and resin surfaces suggesting that a thin layer of resin may have been left behind on the delaminated side. If confirmed, this is a confirmation that the strength of the metal-resin interface has been substantially increased.

Metal to Metal Quantitative Shear Strength Testing:

12 aluminum blocks 1⅛" long were cut from a 1"×1"×36" solid aluminum rod. These were subsequently milled down to 1" long to form cubes, with two sides having well-controlled and consistent flatness. Each cube was scored along an edge between two non-milled sides to easily display an orientation. All the cubes were sonicated in isopropyl alcohol and $CH_2Cl_2$ on Jul. 8, 2013, then six of the cubes were treated with steps #2-7. All steps after #1 were done in a 250 mL beaker, in which the six cubes could be stacked, minimizing the amount of solvents needed for the process. Steps #7-10 were performed on Aug. 9, 2013. The solution for functionalization was 170 mL MeOH with 2 mL APTMS (0.67 M). Due to a power outage, the blocks were left in the solution for 2.5 hours and allowed to dry for another 2 hours. Two sets of three unmodified blocks were epoxied together linearly using a mixture of 6 mL resin and 2 mL hardener, with the central block offset from the outer two by ¼". The modified blocks were treated identically in the dry box less than 20 minutes later.

After allowing the resin to cure for 3 days (Aug. 9, 2013 to Aug. 12, 2013) the modified pieces were removed from the dry box and the four sets of cubes marked either "oven cure" or "air cure." Unfortunately, the unmodified blocks intended to be air cured were not sufficiently epoxied together and came apart. The blocks labelled "oven cure" were placed in an oven at 50° C. for 23 hours. The total length of coverage was measured with a micrometer for the two sets of oven cured blocks: 19.57 mm for the unmodified and 17.74 mm for the modified. On Aug. 14, 2013 excess resin was removed from the front and back sides of each set of oven cured blocks using a steel file.

Figure 6:
FIG. 6 illustrates a photograph of a 3-block testing arrangement according to an embodiment of the present disclosure.

On 2013 Aug. 16 the cubes were tested using a mechanical press to apply pressure and an Interface load cell with 5000 lbf capacity and 4.352 mV/V output (model 3210BFG-5K-B). 10 VDC was used as the excitation voltage and the output voltage was measured using a Fluke 189 micrometer. The modified, air cured Al cubes were pressed first using two different mechanical presses and then a hydraulic press, each with increasing capacities. As this sample did not have a control, it was deemed acceptable to work out issues with the testing process. The capacity of the load cell was exceeded without breaking the blocks apart when doing the measurements with the second mechanical press, so it was not used when the hydraulic press was applied. The highercapacity mechanical press was used to break apart the two oven cured sets of cubes; the output of the load cell for the unmodified was 9.6 mV and the output for the modified was 34.4 mV. These correspond to values of 1,100 lbf and 3,950 lbf for the unmodified and modified blocks, respectively. A picture in FIG. 6 of the postbreak setup is shown below, reset to the original position.

Figure 8:
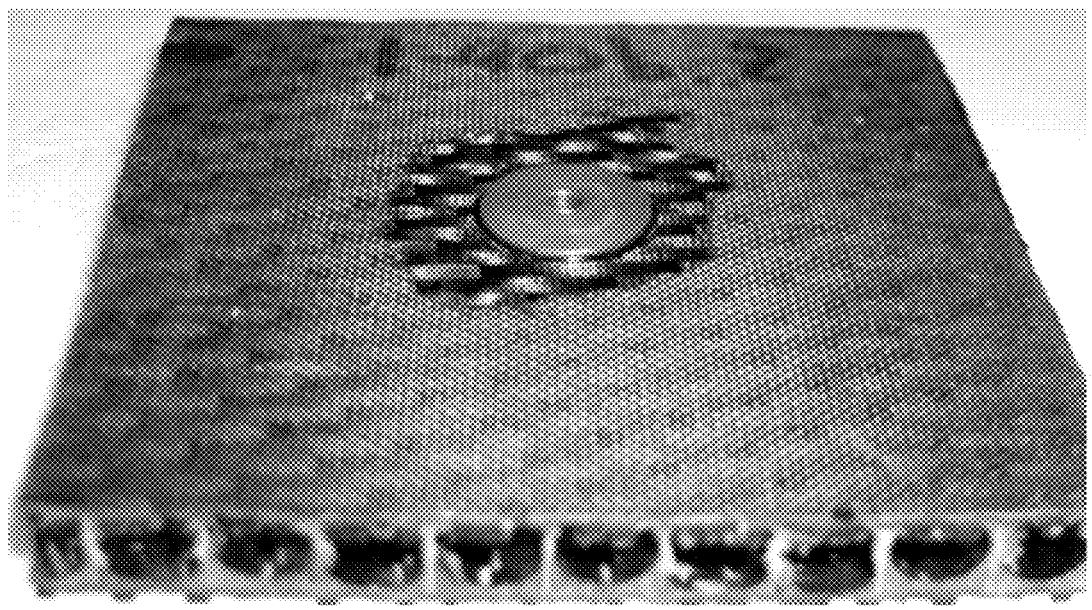
FIG. 8 illustrates a photographic close-up of the samples prepared for the test in FIG. 7, according to an embodiment of the present disclosure.

Metal to Carbon Fiber Tensile Strength Testing:

FIG. 7 illustrates a data table of the tensile strength testing as follows hereinbelow. Aluminum rivet nut inserts of 4-40 and 2-56 sizes were prepared and functionalized as discussed above, using a 0.1 M methanol solution. A carbon fiber composite board was made by epoxying two carbon fiber woven sheets to a honeycomb fiberglass support via vacuum bagging. This board was allowed to cure at room temperature over the course of four weeks. After curing, the board was cut into squares measuring 2 inches per side; it was ⅛th of an inch thick. Holes of the appropriate size were drilled into the centers of each square. Control and functionalized pieces were affixed to the composite board by applying the epoxy around the holes then pushing in the fasteners so that the flange adhered to the carbon fiber surface. This was the first time functionalized metal pieces had been epoxied to something outside of the dry box. The epoxy was allowed to gel over 16 hours then the pieces were cured in an oven at 50° C. for 24 hours. A close up picture of one of the test samples is shown in FIG. 8. To test the fasteners' adhesion to the composite, screws were put into the fasteners and pushed through with a press, with the amount of force needed measured by a load cell. The load cell used was a Revere Transducers 63HU model, 100 lbf capacity, 3.0 mV/VDC output; the excitation voltage was 10.0 VDC.

The adhered fastener/composite board pieces were labelled according to the page in the lab notebook they were originally listed on, followed by a letter and number. "a" pieces were the unmodified controls, while "b" pieces had been functionalized; 4-40 fasteners were "0.1", while the 2-56 fasteners were "0.2"; so an example sample number was "1-90a.1" for the unmodified 4-40 fastener epoxied to the composite board. The contact areas of the 4-40 and 2-56 fasteners were 9.61e-5 m2 and 6.10e-5 m2, respectively, which were used to calculate the strength of the bonding.

Figure 9:
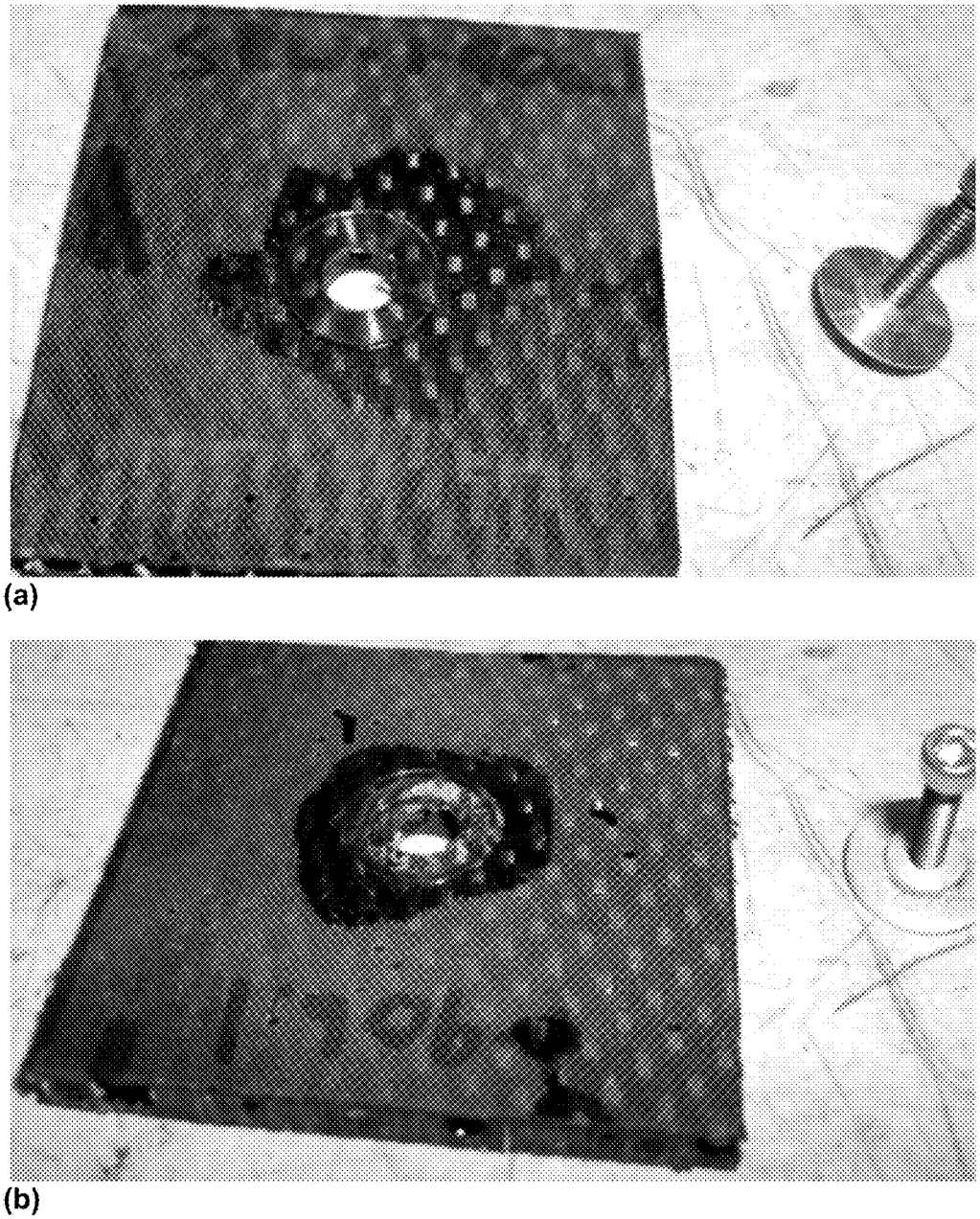
FIG. 9 illustrates a photographic close up of a control sample (a) after testing compared to a sample prepared according to an embodiment of the present of disclosure (b), where both use the same metal hardware.
Figure 10:
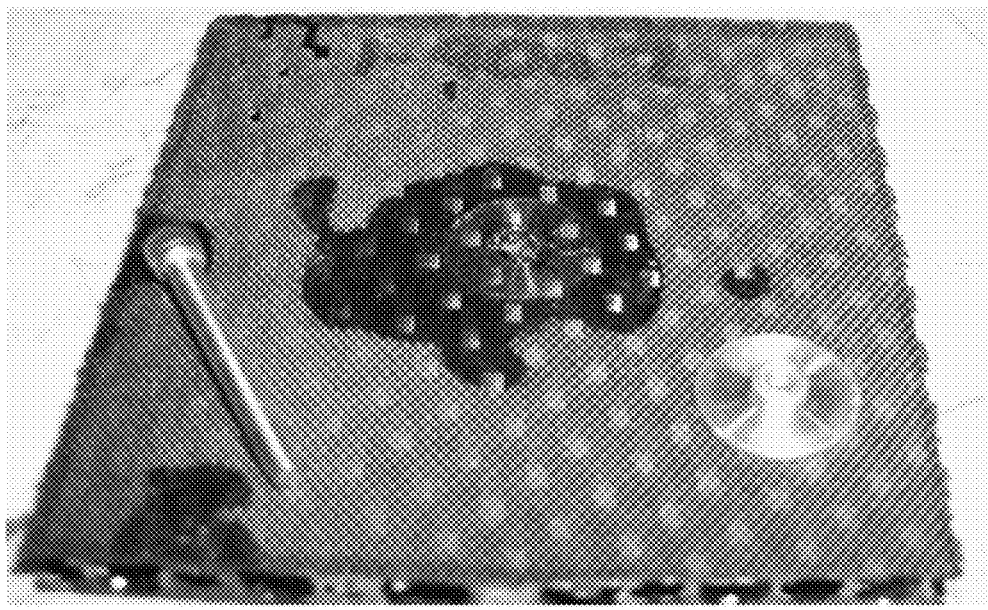
FIG. 10 illustrates a photographic close up of a control sample (a) after testing compared to a sample prepared according to an embodiment of the present of disclosure (b), where both use the same metal hardware.
Figure 10:
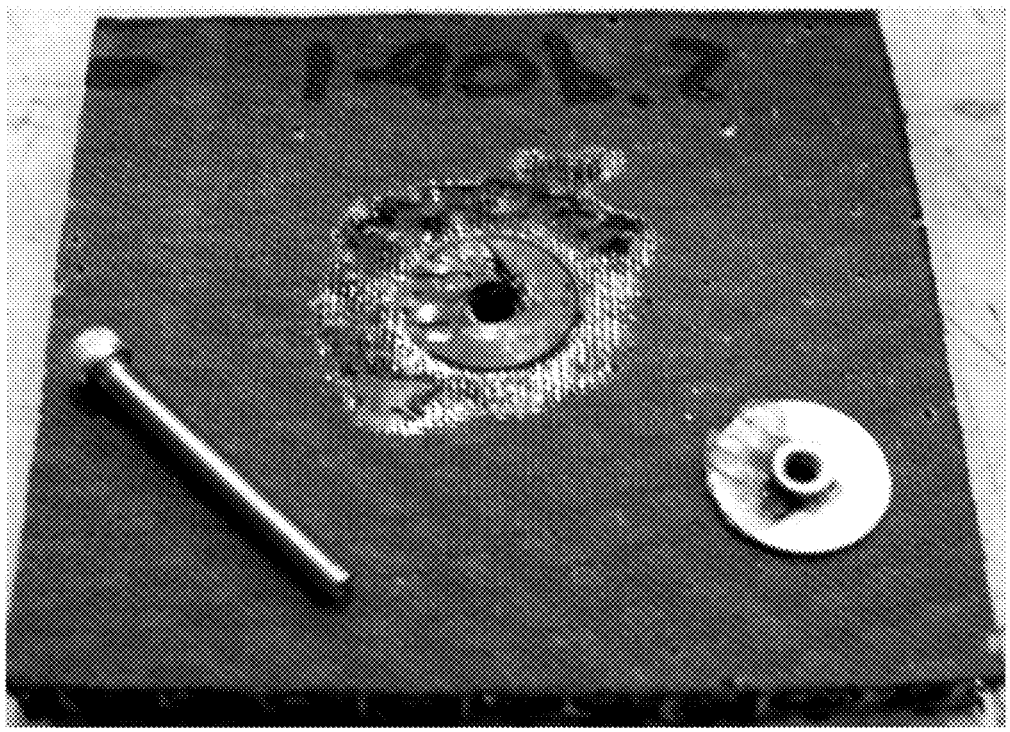

The functionalized 4-40 fastener separated from the board relatively easily, especially when compared to the functionalized 2-56 fastener. However, in that test there was substantial deformation of the composite board, suggesting alternate methods of de-adhesion. Notably, both of the treated fasteners still had epoxy sticking to them after the test, with the 2-56 fastener also having some carbon fiber stuck in the epoxy as well. This further supports our hypothesis that the mechanism of failure has moved from the metal-epoxy interface to internally in the epoxy. Post-test pictures of the pieces are shown in FIG. 9 and FIG. 10.

Figure 11:
FIG. 11 illustrates a photograph of a vacuum bagging arrangement according to an embodiment of the present disclosure.

Metal to Carbon Fiber Peel Testing:

Aluminum sheet metal was cut into 4 L-shaped "cards," where the base was 2"×2" with a 1"×1" tab sticking out from one side. Two of these were prepared and functionalized in the method described on page 1, using a 0.065M MeOH solution. This was done between 2013 Sep. 26 and 2013 Sep. 27. On 2013 Sep. 30 two 2"×2" sheets of carbon fiber were cut and soaked in the liquid epoxy resin, then the two sets of aluminum "cards" were used to sandwich the carbon fiber sheets. The resulting two Al carbon fiber-Al composite pieces were then compressed using the vacuum bagging method overnight (~16 hours) as shown in FIG. 11. Upon removal from the vacuum bagging apparatus the cards were cured in an oven at 50° C. for 8 hours. The unfunctionalized control was labelled "SRW-102-unfunc" and the functionalized piece was "SRW-102-func."

Figure 12:
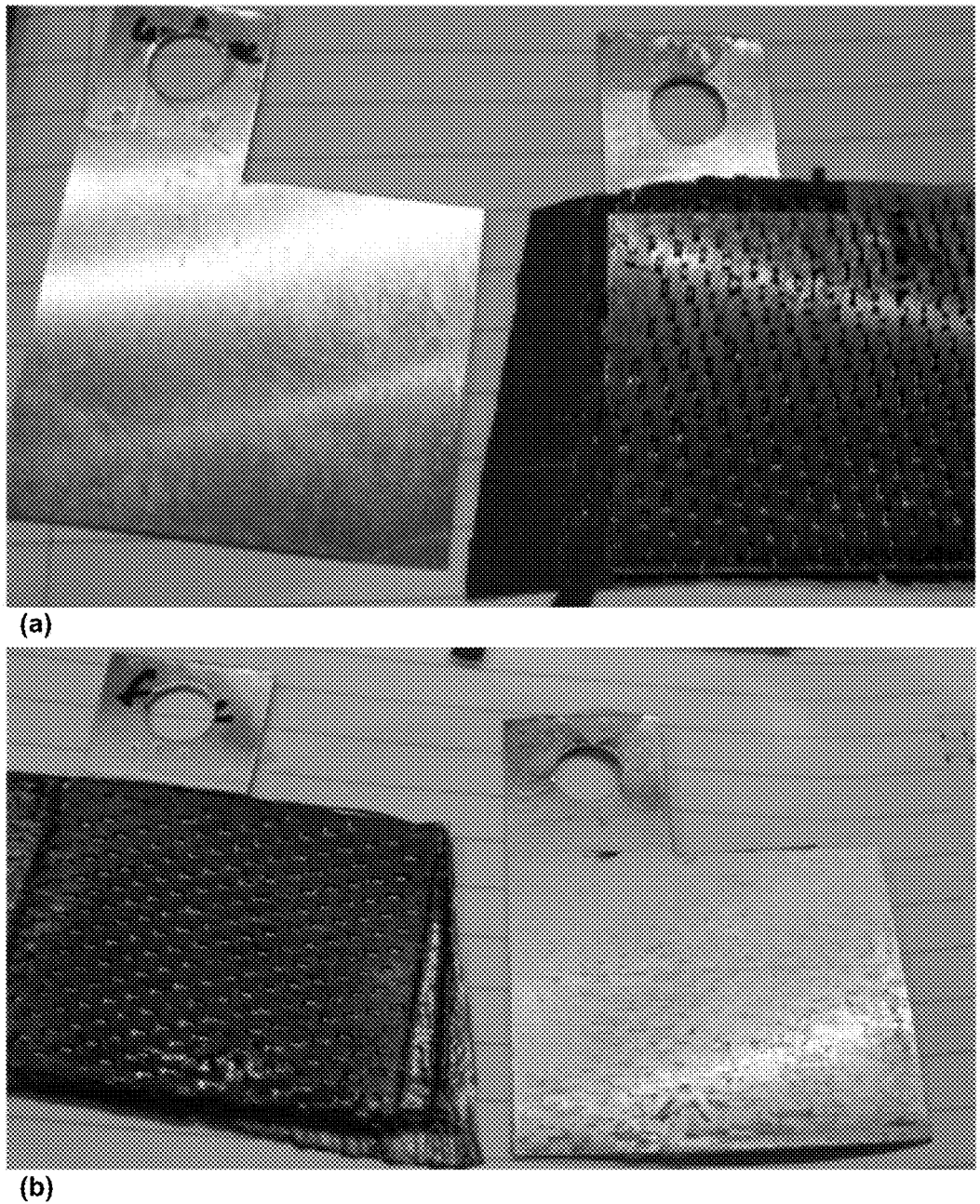
FIG. 12 illustrates a photographic close up of a control sample (a) after testing compared to a sample prepared according to an embodiment of the present disclosure (b)

On 2013 Oct. 8 the cards had holes punched in each "tab" which were then used to attach a nut and bolt to each. One bolt from each pair was screwed into the 100 lbf load cell, with the other into the drill press in the lab positioned so that the drill press could be pulled away from the load cell. The pieces were then pulled apart. SRW-102-unfunc delaminated in a single, quick stroke that resulted in complete delamination; the load cell reading was 0.004 V (13 lbf, 59 N). FIG. 12 shows the post-test pieces wherein SRW-102-unfunc is show in (a) and SRW-102-func is shown in (b). In contrast, SRW-102-func delaminated in stages, accompanied by a loud ripping sound; the load cell reading was 0.008V (27 lbf, 119 N), a 100% increase. Additionally, there was epoxy and strands of carbon fiber still attached to both pieces, as seen in FIG. 12 (b).

Figure 13:
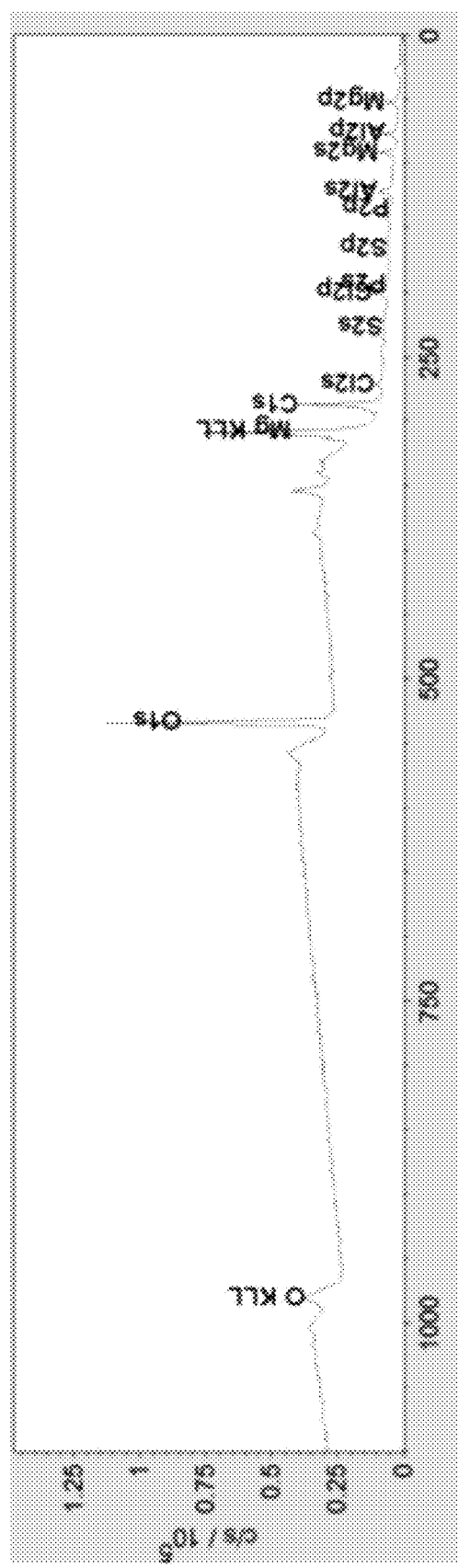
FIG. 13 illustrates an X-ray spectrograph of the binding energy of dichloromethane sonicated aluminum strip.
Figure 14:
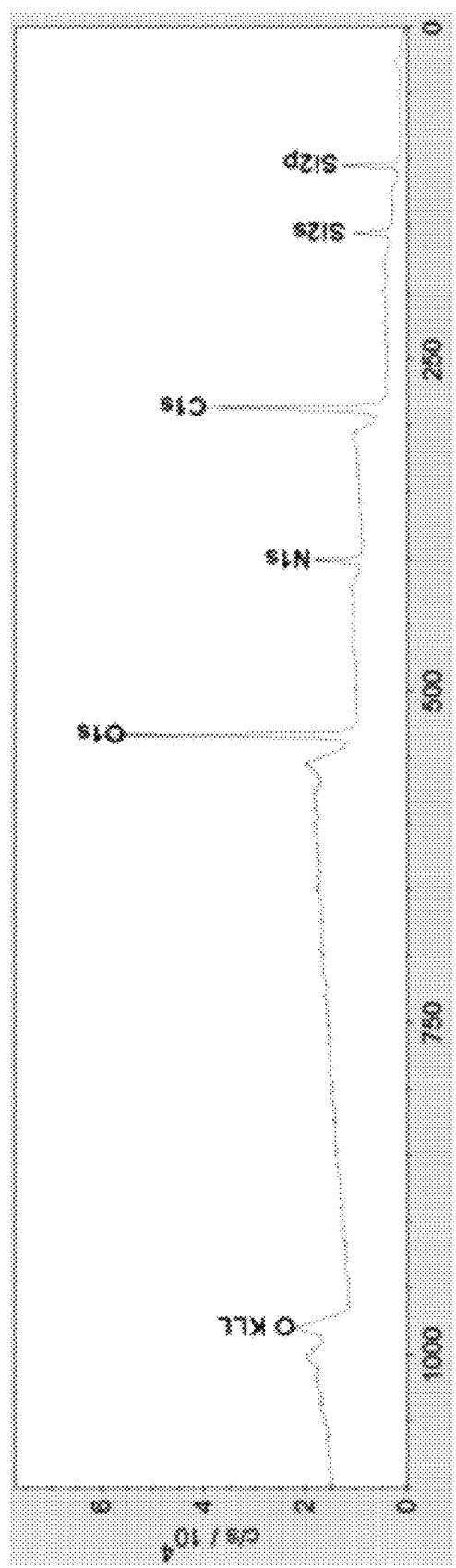
FIG. 14 illustrates an X-ray spectrograph of the binding energy of aluminum strip prepared according to an embodiment of the present disclosure.

XPS Surface Analysis: Two small (1"×0.5") strips of aluminum were cut from a piece of sheet metal, with one being functionalized and the other sonicated for 5 minutes in dichloromethane. Their surface compositions were tested via X-ray photoelectron spectroscopy to quantify the effect of the cleaning and functionalization process. The results are shown in FIG. 13 (cleaned) and FIG. 14 (cleaned and functionalized). Note the x-axis of each graph is binding energy, measured in electron volts (eV). These results show that the LumaDyne process cleans the surface very well and results in a monolayer with few, if any, defects or gaps.

Other Experiments: Further experiments include the functionalization of stainless steel (alloy 304) and titanium (Grade 2) with corresponding peel tests, as well as layering experiments with multiple metals adhered to one another. Other types of adhesives have been tested, such as West System's 105 resin/206 hardener epoxy, a "five-minute" epoxy, and several cyanoacrylate "Super/Krazy Glues." Also monolayers created with (3-triethoxysilyl)propyl isocyanate (TESPI) have been tested. However, due to the differences in reactivity between APTMS and TESPI, the fuctionalization solution utilizes of a nonreactive solvent such as hexanes/CCl4.

Embodiments disclosed herein, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as "comprises", "includes", and "having" should be understood to provide support for narrower terms such as "consisting of", "consisting essentially of", and "comprised substantially of". Accordingly, the scope of protection is not limited by the description set out above but is defined by the claims that follow, that scope including all equivalents of the subject matter of the claims. Each and every claim is incorporated as further disclosure into the specification and the claims are exemplary embodiment(s) of the present invention. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural or other details supplementary to the disclosure.

What is claimed is:

1. A method for binding a metal composite, comprising
stripping contaminants from the metal;
washing the decontaminated metal;
oxidizing the decontaminated metal;
stabilizing the oxidized metal;
depositing a self-assembled monolayer on the oxidized metal;
applying an adhesive to the self-assembled monolayer; and
bonding a material to the adhesive to form a metal composite.

2. The method of claim 1, wherein stripping contaminants comprises sonicating the metal in contact with at least one solvent.

3. The method of claim 1, wherein washing the decontaminated metal comprises flushing the surface of the metal with a surfactant.

4. The method of claim 3, wherein the surfactant comprises ultra-pure water.

5. The method of claim 1, wherein oxidizing the decontaminated metal comprises treating the decontaminated metal with acid.

6. The method of claim 5, wherein the acid comprises at least one acid chosen from the group consisting of citric acid, acetic acid, sulfuric acid, hydrochloric acid, nitric acid, phosphoric acid, and combinations thereof.

7. The method of claim 5, wherein the acid comprises a concentration of at least 20 wt %.

8. The method of claim 5, further comprising heating the metal and the acid to a temperature of at least 80° C.

9. The method of claim 1, wherein stabilizing the oxidized metal comprises removing the acid and maintaining the oxidized metal in a substantially water free environment.

10. The method of claim 1, wherein depositing a self-assembled monolayer on the oxidized metal comprises coating a monolayer precursor on the oxidized metal.

11. The method of claim 10, further comprising maintaining conditions such that the precursor self-assembles into a monolayer.

12. The method of claim 10, wherein the monolayer precursor comprises a silane.

13. The method of claim 1, wherein applying an adhesive comprises choosing an adhesive that will covalently bond to the self-assembled monolayer.

14. The method of claim 1, wherein bonding a material to the adhesive further comprises bonding a fibrous composite to the adhesive.

15. The method of claim 1, wherein a fibrous composite comprises at least one chosen from the group of fiber-reinforced composites consisting of fiberglass, carbon fiber, and aramid fiber composites.

* * * * *